US008812164B2

(12) United States Patent
Marchitto et al.

(10) Patent No.: US 8,812,164 B2
(45) Date of Patent: Aug. 19, 2014

(54) PORTABLE COGENERATION SYSTEM INCORPORATING RENEWABLE ENERGY SOURCES

(75) Inventors: Michael Marchitto, Orange, CT (US); Brian Bassett, Oxford, CT (US); Gene Frohman, Woodbridge, CT (US); Scott Wurms, Shelton, CT (US); Keven Robert Roche, West Haven, CT (US); Scott Sheldon Ramsay, Oxford, CT (US)

(73) Assignee: Engineered Electric Company, Bridgeport, CT (US)

( * ) Notice: Subject to any disclaimer, the term of this patent is extended or adjusted under 35 U.S.C. 154(b) by 133 days.

(21) Appl. No.: 12/902,623

(22) Filed: Oct. 12, 2010

(65) Prior Publication Data

US 2012/0089256 A1    Apr. 12, 2012

(51) Int. Cl.
*G05D 13/00* (2006.01)

(52) U.S. Cl.
USPC ........... 700/288; 700/291; 700/295; 700/276; 700/287; 700/297

(58) Field of Classification Search
USPC ....................................................... 700/288
See application file for complete search history.

(56) References Cited

U.S. PATENT DOCUMENTS

| 4,455,614 | A | * | 6/1984 | Martz et al. .................... 700/288 |
| 5,552,640 | A | * | 9/1996 | Sutton et al. ................. 290/40 B |
| 5,884,481 | A | * | 3/1999 | Johansson et al. .............. 60/517 |
| 5,929,538 | A | * | 7/1999 | O'Sullivan et al. ............. 307/66 |
| 5,969,435 | A | * | 10/1999 | Wilhelm .......................... 307/64 |
| 6,367,272 | B1 | * | 4/2002 | Zeng et al. .................... 62/228.5 |
| 6,757,591 | B2 | * | 6/2004 | Kramer .......................... 700/288 |
| 6,885,914 | B2 | * | 4/2005 | Shimode et al. .............. 700/288 |
| 6,938,417 | B2 | * | 9/2005 | Watanabe et al. ............... 60/597 |
| 7,065,471 | B2 | * | 6/2006 | Gotoh et al. .................. 702/183 |
| 7,280,925 | B1 | * | 10/2007 | Eker et al. ........................ 702/34 |
| 7,449,798 | B2 | * | 11/2008 | Suzuki et al. ................... 307/65 |
| 7,469,541 | B1 | * | 12/2008 | Melton et al. ................ 60/641.1 |
| 7,496,798 | B2 | * | 2/2009 | Link et al. .................... 714/47.2 |
| 7,695,049 | B2 | * | 4/2010 | Colborne ...................... 296/161 |
| 7,696,642 | B2 | * | 4/2010 | Wakitani et al. ................ 307/65 |

(Continued)

FOREIGN PATENT DOCUMENTS

| JP | 2005-147658 A | 6/2005 |
| JP | 2010-133427 A | 6/2010 |
| KR | 10-2004-0083513 A | 10/2004 |
| KR | 10-2009-0098110 A | 9/2009 |

OTHER PUBLICATIONS

International Application No. PCT/US2011/055996, International Search Report and Written Opinion mailed on Apr. 13, 2012, 10 Pages.

*Primary Examiner* — Kavita Padmanabhan
*Assistant Examiner* — Christopher E Everett
(74) *Attorney, Agent, or Firm* — Kilpatrick Townsend & Stockton LLP (57) ABSTRACT

A cogeneration system comprising a power generation unit, a thermal generation unit thermally coupled to the power generation unit, a plurality of renewable energy conversion units, and a power distribution unit configured to receive and distribute power from the power generation unit, thermal generation unit and the renewable energy conversion unit where the power distribution unit reduces the amount of power produced by the power generator based on the amount of power provided by the renewable energy conversion units.

24 Claims, 7 Drawing Sheets

(56) References Cited

U.S. PATENT DOCUMENTS

| | | | |
|---|---|---|---|
| 7,787,997 B2* | 8/2010 | Richards et al. | 700/291 |
| 7,979,166 B2* | 7/2011 | Yamada et al. | 700/291 |
| 8,061,139 B2* | 11/2011 | Bronicki | 60/618 |
| 8,180,499 B2* | 5/2012 | Kanai | 700/288 |
| 8,193,661 B2* | 6/2012 | Jagota et al. | 307/65 |
| 2002/0035495 A1* | 3/2002 | Spira et al. | 705/7 |
| 2002/0108745 A1* | 8/2002 | Kimura | 165/236 |
| 2003/0120402 A1* | 6/2003 | Jaw | 701/29 |
| 2004/0267408 A1* | 12/2004 | Kramer | 700/291 |
| 2008/0161974 A1* | 7/2008 | Alston | 700/276 |
| 2008/0217998 A1* | 9/2008 | Parmley | 307/65 |
| 2008/0257284 A1* | 10/2008 | Otterstrom et al. | 123/2 |
| 2008/0262857 A1* | 10/2008 | Perera | 705/1 |
| 2008/0288321 A1* | 11/2008 | Dillon et al. | 705/9 |
| 2009/0015021 A1* | 1/2009 | Towada | 290/1 A |
| 2009/0126381 A1* | 5/2009 | Diaz | 62/238.1 |
| 2009/0216387 A1* | 8/2009 | Klein | 700/296 |
| 2009/0259507 A1* | 10/2009 | Miwa et al. | 705/8 |
| 2010/0138062 A1 | 6/2010 | Zheng et al. | |
| 2010/0205990 A1* | 8/2010 | French et al. | 62/239 |
| 2010/0207452 A1* | 8/2010 | Saab | 307/65 |
| 2011/0089911 A1* | 4/2011 | Loisel et al. | 322/88 |
| 2011/0175444 A1* | 7/2011 | Yunes et al. | 307/23 |
| 2011/0193346 A1* | 8/2011 | Guzman et al. | 290/52 |
| 2011/0245986 A1* | 10/2011 | Campanile et al. | 700/288 |
| 2011/0316480 A1* | 12/2011 | Mills-Price et al. | 320/109 |
| 2012/0104785 A1* | 5/2012 | Hixson et al. | 296/24.36 |
| 2012/0166249 A1* | 6/2012 | Jackson | 705/7.28 |

* cited by examiner

PORTABLE COGENERATION SYSTEM INCORPORATING RENEWABLE ENERGY SOURCES

FIELD OF THE INVENTION

The present disclosure relates generally to portable cogeneration systems which are capable of producing electricity by incorporating renewable energy sources.

BACKGROUND OF THE INVENTION

The report, "More Fight—Less Fuel," from the Defense Science Board Task Force on DoD Energy Strategy (February 2008), clearly details the imperative to reduce battlespace fuel demand. The costs of fuel, particularly in the battlefield environment, both in monetary terms and risks posed to personnel, can not be understated. It also explains, "... during wartime, generators become the largest single fuel consumers on the battlefield. Gensets in Iraq, overwhelmingly used for space-cooling, seem especially amenable to innovative technical solutions for improved fuel and load efficiency." (page 44, section 4.2.1.2)

Currently, separate diesel generator sets (gensets) with electrically powered environmental control units (ECUs) are used in the battlefield. These gensets require substantial fuel to operate and do not recover any energy, such as heat energy, expended during the operation of the genset. Further, the current gensets do not incorporate any renewable energy sources.

Substantial fuel savings can be realized over the current use of separate diesel generator sets (gensets) with electrically powered environmental control units (ECUs) by the integration of power generation with heating and cooling within a single, stand-alone system.

SUMMARY OF THE INVENTION

In accordance with systems consistent with the present disclosure, a cogeneration system which includes a power generation unit, a thermal power generation unit thermally coupled to the power generation unit, a plurality of renewable energy conversion units and a power distribution unit configured to receive and distribute power from the power generation unit, thermal power generation unit and the renewable energy conversion unit where the power distribution unit reduces the amount of power produced by the power generation unit based on the amount of power provided by the renewable energy conversion units.

In accordance with methods consistent with the present disclosure, a method is provided to minimize the amount of fuel consumed by a power generation unit by querying a plurality of renewable energy conversion units and a thermal generation unit to determine the amount of power available from each unit based on environmental conditions, transmitting a signal to a power generation unit to reduce the amount of power produced by the power generation unit by an amount equal to the power available from the environmental conversion units and thermal generation unit and instructing the environmental conversion units to provide power to a power distribution unit.

Other systems, methods, features, and advantages of the present application will be or will become apparent to one with skill in the art upon examination of the following figures and detailed description. It is intended that all such additional systems, methods, features, and advantages be included within this description, be within the scope of the disclosure, and be protected by the accompanying claims.

BRIEF DESCRIPTION OF THE DRAWINGS

The accompanying drawings, which are incorporated in and constitute a part of this specification, illustrate an implementation of the present application and, together with the description, serve to explain the advantages and principles of the application. In the drawings.

DETAILED DESCRIPTION OF THE INVENTION

Referring now to the drawings which depict different embodiments consistent with the present disclosure. Wherever possible, the same reference numbers will be used throughout the drawings and the following description to refer to the same or like parts.

As discussed in further detail herein, the cogeneration system is configured to minimize the use of combustible fuels by incorporating electrical power produced by renewable energy sources. The system is controlled by an automatic control system which determines the amount of renewable energy available and reduces the electrical output of a generator based on the electricity provided by the renewable energy sources. In addition, the system uses excess heat recovered from the generator to produce more electrical power and to provide heat to an environmental unit.

Figure 1:
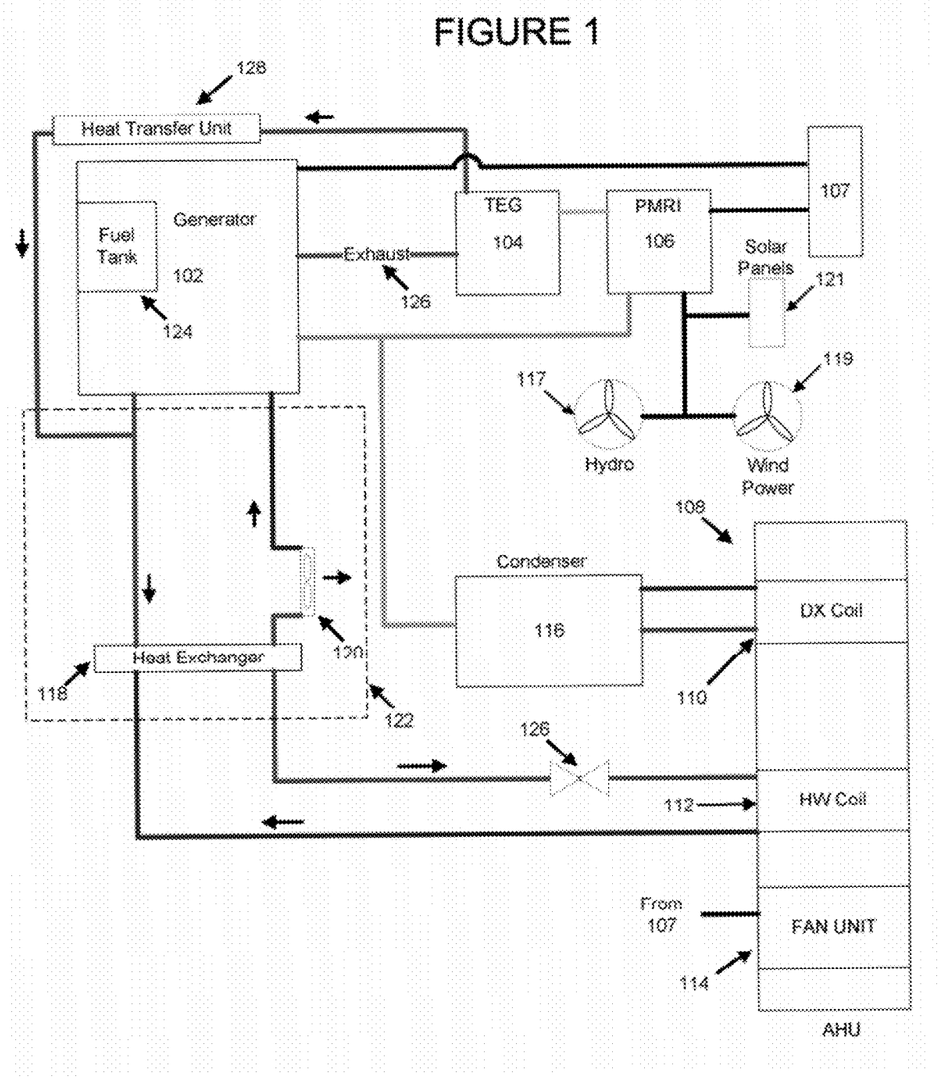
FIG. 1 depicts one embodiment of a cogeneration system consistent with the present application.

FIG. 1 depicts one embodiment of a cogeneration system consistent with the present disclosure. The cogeneration system includes a generator 102, a temperature energy generator ("TEG") 104 a permanent magnet generator/inverter ("PMGI") 106, a power distribution unit 107, and an air handling unit ("AHU") 108.

In further accordance with the present disclosure, the generator 102 may be, but is not limited to, an internal combustion engine capable of running at a single or variable speed and which includes a hydronic cooling system 122, a fuel tank 124 and a combustion exhaust system 126. Fuel for the generator 102 is stored in a fuel tank 124 which is hydronically connected to the generator 102. The generator 102 is capable of operating using any combustible liquid including, but not limited to, diesel fuel, gasoline, bio-fuels, ethanol, methanol, or any other liquid or gas capable of combustion. The fuel tank 124 may be located inside the generator 102 or external from the generator 102 and includes a level sensing unit which is capable of detecting the amount of fuel in the fuel tank 124 as well as a leak detection unit capable of detecting a leak in the fuel tank 124.

In further accordance with the present disclosure, the generator is cooled using a hydronic cooling system 122 which includes a radiator unit 120 and a heat exchanger 118. The heat exchanger 118 transfers heat generated by the generator 102 during operation to a hydronic heating coil ("heating coil") 112 located in the AHU 108. One side of the heat exchanger 118, the primary side, is hydronically connected to the generator 102 while another side, the secondary side, of the heat exchanger 118 is hydronically connected to the heating coil 112. A hydronic flow control device 126 located on the secondary side of the heat exchanger 118 modulates the amount of heat transferred to the heating coil 112. In addition, a radiator 120 located on the primary side of the heat exchanger 118 cycles to reduce the temperature of the fluid before it enters the generator 102.

In further accordance with the present disclosure, the exhaust system 126 of the generator 102 is thermally connected to the TEG unit 104. The TEG unit 104 is capable of converting heat energy from the generator 102 into electrical energy. Excess heat from the TEG unit 104 is transferred to the primary side of the generator hydronic cooling system 122 via a heat transfer unit 128 including, but not limited to, an air to water heat transfer device. Electricity produced by the TEG unit 104 is transferred to the PMGI 106 via an electrically conductive connection. The TEG unit 104 may be, but is not limited to, a thermal electric generator.

In further accordance with the present disclosure, the PMGI unit 106 includes a permanent magnetic generator which is mechanically coupled to the generator 102. The power distribution unit 107 is configured to consolidate the electrical power from the generator 102 and the PMGI 106 and to distribute the electrical power to electrically powered devices, including, but not limited to, the fan unit 114, laptops, lights, pumps, or any other electrically powered devices. In one embodiment, the power distribution unit 107 provides a plurality of configurable electrical connections where each electrical connection is capable of providing 120 or 220 volts AC of power.

In further accordance with the present disclosure, the AHU 108 includes a direct expansion cooling coil ("DX Coil") 110, a heating coil 112 and a fan unit 114. The fan unit 114 is powered from electricity generated by the cogeneration system 100 via the distribution system 107. The DX coil 110 is hydronically coupled to a compressor in the condensing unit 116 which includes a heat exchanging unit and a compressor which compresses a refrigerant capable of transferring heat including, but not limited to, R407D. In one embodiment, the compressor in the condensing unit 116 is powered by electricity generated by the cogeneration system via the distribution unit 107. In another preferred embodiment, the generator 102 directly drives the compressor in the condensing unit 116 via a rotating shaft or flexible belt mechanically coupled to the generator engine.

In another embodiment consistent with the present disclosure, the cogeneration system includes renewable energy conversion units, including but not limited to, solar energy conversion units 121, wind energy conversion units 119, and hydronic energy conversion units 117 which may be integrated into the cogeneration system 100 via the PMGI 106. To connect the renewable energy sources to the cogeneration system, the PMGI 106 may include an external power receiving unit and an inverter unit, which are capable of receiving electricity produced by a plurality of renewable energy sources including, but not limited to, solar energy conversion units 121, wind energy conversion units 119, hydronic energy conversion units 117, geothermal energy conversion units or any other naturally occurring power source. The PMGI unit 106 is configured to convert the power from the external power sources into a suitable energy output. Each external energy source includes a separate programmable control unit ("PCU") which monitors the amount of energy the energy source is supplying as well as the amount of energy the energy source is capable of producing.

Figure 2:
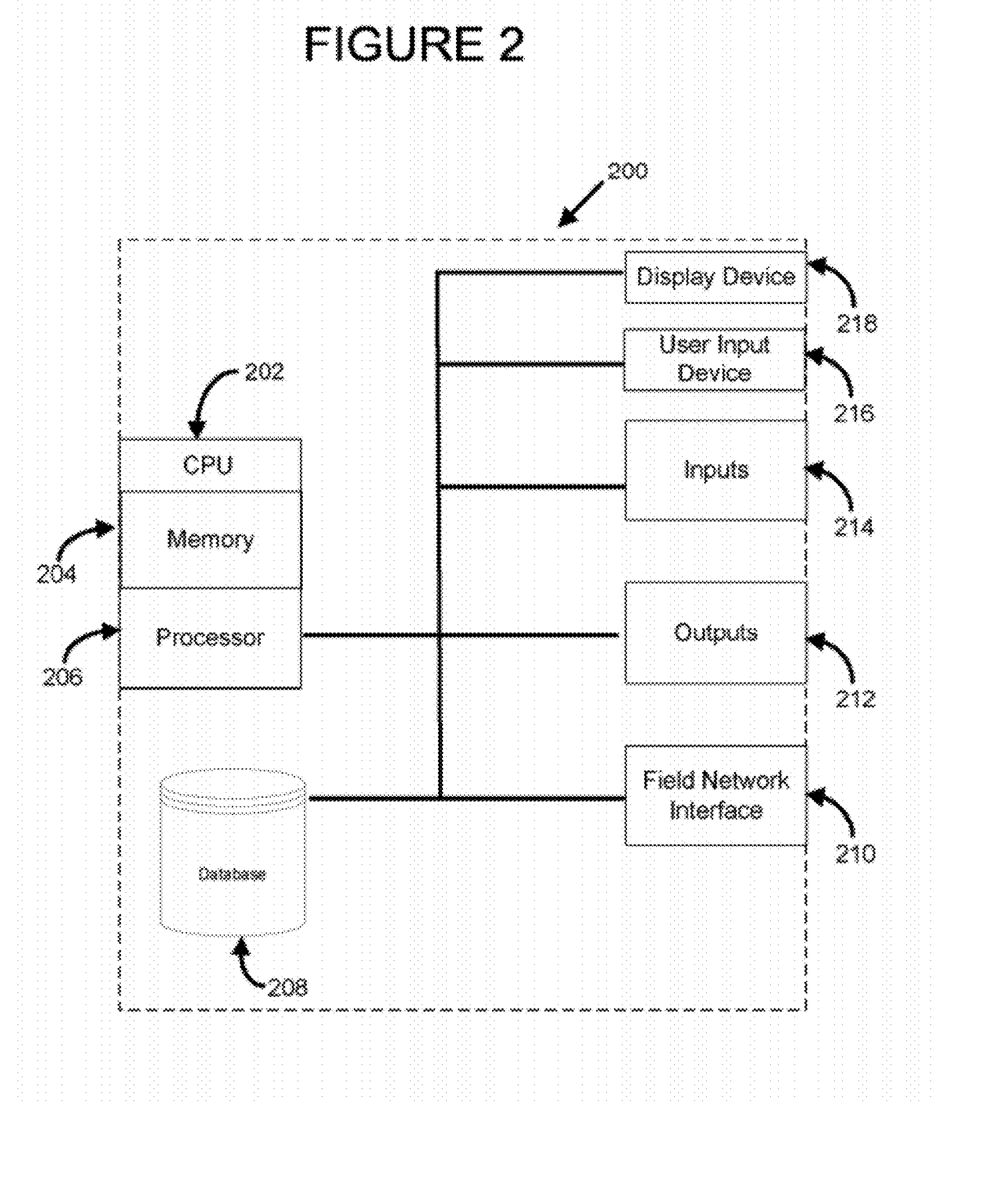
FIG. 2 depicts one embodiment of a programmable control unit consistent with the present application.

FIG. 2 depicts a schematic representation of one embodiment of a programmable control unit ("PCU") 200 which is used to control the cogeneration system 100. Each component of the cogeneration system is controlled by a separate PCU 200 which is electrically powered by the generator 102 via the distribution panel 107. Each PCU includes a central processing unit ("CPU") 202 which includes a memory 204 and a processor 206, a database 208, a field network interface 210, a plurality of outputs 212 and a plurality of inputs 214. In one embodiment, the PCU 200 may include a display device 218 and at least one user input device 216, such as a keyboard or mouse. In another embodiment, the PCU 200 may include a display device 218 which is capable of receiving user inputs, such as a touch screen display.

In one embodiment, each of the plurality of outputs 212 on the PCU 200 is operatively configured to provide control signals to external control devices and each of the plurality of inputs 214 is operatively configured to receive signals from external sensing devices. A plurality of software routines running on the CPU 202 are capable of transmitting a signal to each of the external control devices connected to the outputs 212 based on readings from the external sensing devices coupled to the inputs 214.

Figure 3:
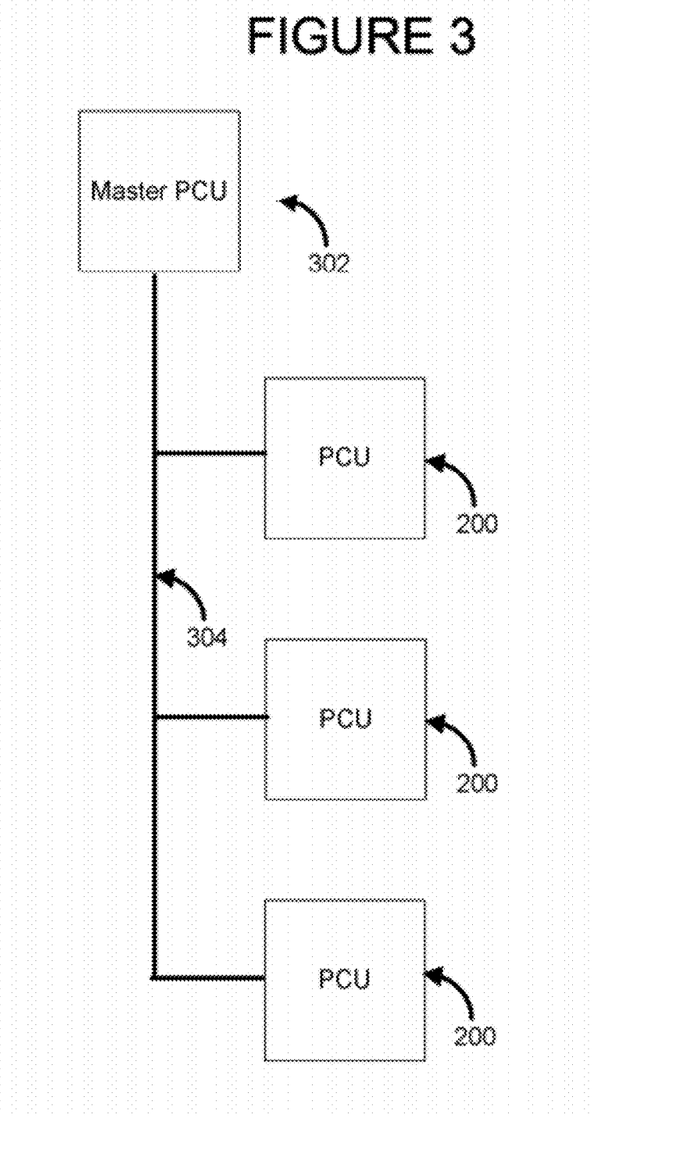
FIG. 3 depicts one embodiment of the PCU network consistent with the present application.

FIG. 3 depicts one embodiment of the PCU network consistent with the present disclosure. A plurality of PCUs 200 are connected to one another via the field network 304. One PCU is designated as the Master PCU 302. The Master PCU 302 is used to control the overall operation of the cogeneration system 100. In one embodiment, the Master PCU 302 is also used to control at least one component of the cogeneration system 100. In another embodiment, the Master PCU 302 directly controls each component of the cogeneration system without the use of any other PCU or PCU network. In yet another embodiment, the Master PCU 302 is a separate PCU which does not directly control any component of the cogeneration system.

The field network interface 210 on each PCU 200 allows each PCU 200 to communicate with other PCUs 200 over the field network 304 using a network communication protocol, such as, for example, BACnet, Echelon, CANBUS, Modbus, or TCP/IP, or any other network communication protocol. The PCU 200 connects to the field network 304 using a standard network connection type, such as, for example, a RJ 45 connection, a 802.11 wireless connection, a bluetooth wireless connection, or a RS-485 connection, or any other network connection type.

Figure 4A:
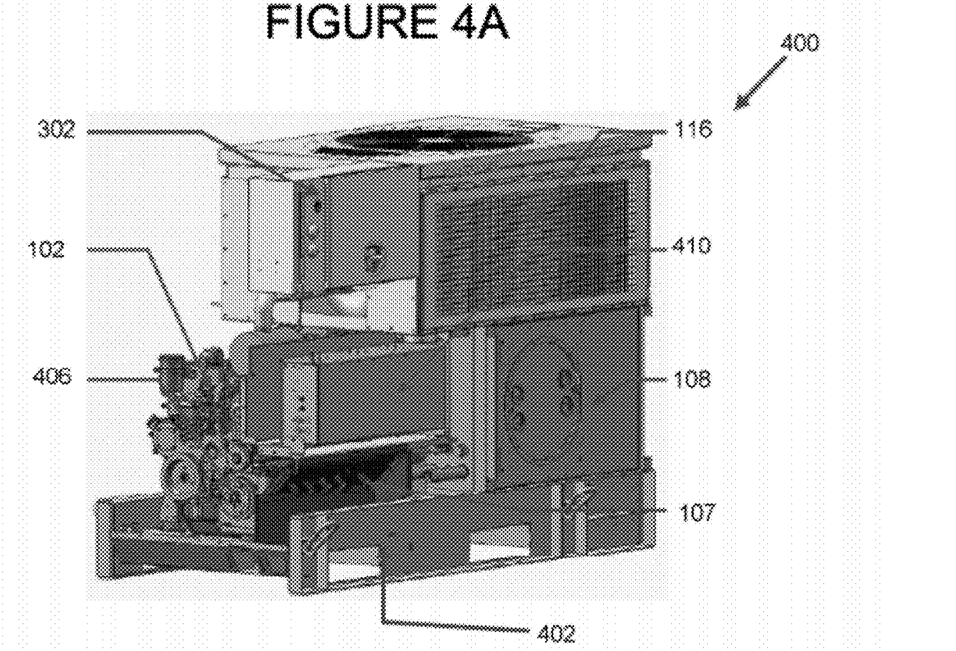
FIGS. 4A and 4B depict front and rear views of one embodiment of a portable cogeneration system consistent with the present application.
Figure 4B:
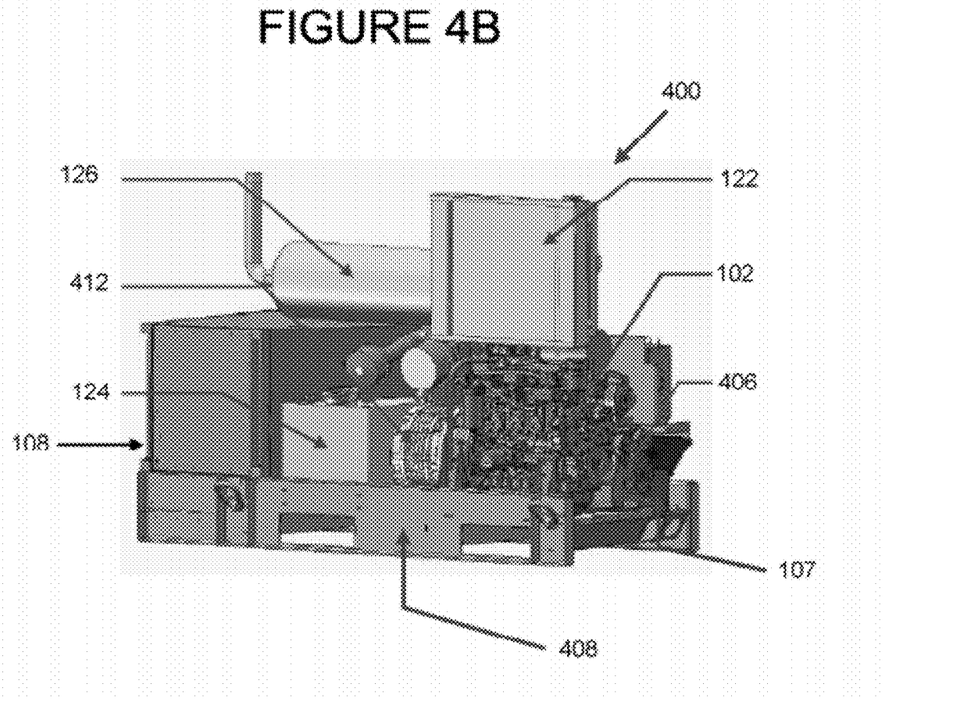
Figure 4C:
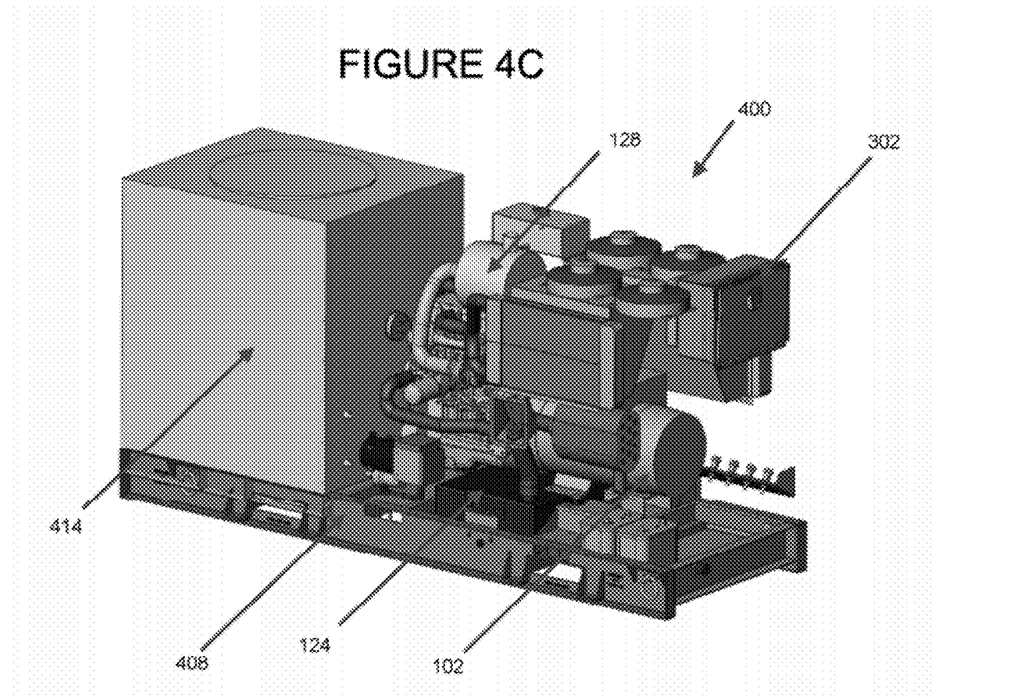
FIGS. 4C and 4D depict right and left side views of one embodiment of the portable cogeneration system consistent with the present application.
Figure 4D:
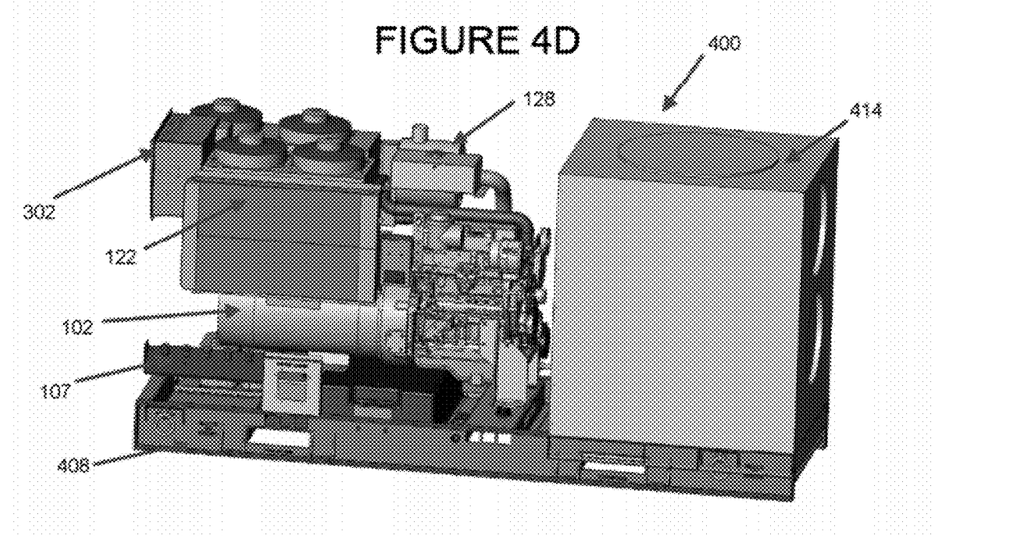

FIGS. 4A and 4B depict one embodiment of a portable cogeneration system 400 consistent with the present disclosure and FIGS. 4C and 4D depict another embodiment consistent with the present disclosure. In both embodiments, the cogeneration system 100 is mounted on a skid 408 and is capable of being transported to a remote location via truck, plane, train or any other method of carrying freight. The skid is capable of carrying the weight of the entire cogeneration system 100 and may be mounted on a trailer which is towed by a vehicle such as, but not limited to, a HMMWV.

FIG. 4A is a right frontal view of one embodiment the portable cogeneration system 400. The generator 102, compressor for the condensing unit 406 and electrical supply terminals 107 are mounted next to one another on one end of the skid 408. The AHU 108 is located on the skid directly behind the generator 102, compressor 406 and distribution unit 107. The compressor for the condensing unit 116 is located directly on top of the AHU 108. The inverter portion of the PMGI 410 is located above the power distribution unit 107 with the Master PCU 302 panel located above the inverter portion of the PMGI 106.

FIG. 4B is a left frontal view of the cogeneration system 400. The permanent magnetic generator ("PMG") of the PMGI 412 is located directly on the generator 102. The fuel tank 124 is located behind the PMG and in front of the AHU 108. The generator hydronic cooling system 122 is located above the generator 102. The exhaust system 126 is located next to the generator hydronic cooling system 122. In one embodiment, the portable cogeneration system is capable of fitting onto a skid and together with the skid measures 82"L× 36"W×59"H.

FIG. 4C is a right side view of another embodiment of the portable cogeneration system 400. In this embodiment, the AHU 108, condensing unit and the compressor for the condensing unit are contained in an Environmental Control Unit ("ECU") 414. The ECU is mounted on a skid 408 and is located behind the generator 102. The fuel tank 124 is located next to the generator 102 on the skid 408. The exhaust system 128 is located above the generator 102 and in front of the ECU 414. The Master PCU panel 302 is located in front of the generator FIG. 4D is a left side view of the cogeneration system 400. The generator hydronic cooling system 122 is located on the side of the generator with the radiator cooling fans located above the generator 102. The exhaust system 126 is located next to the generator cooling system 122. The electrical load terminals 107 are located below the cooling system 122. In one embodiment, the portable cogeneration system is capable of fitting onto a skid and together with the skid measures 37"L×48"W×48"H.

Figure 5:
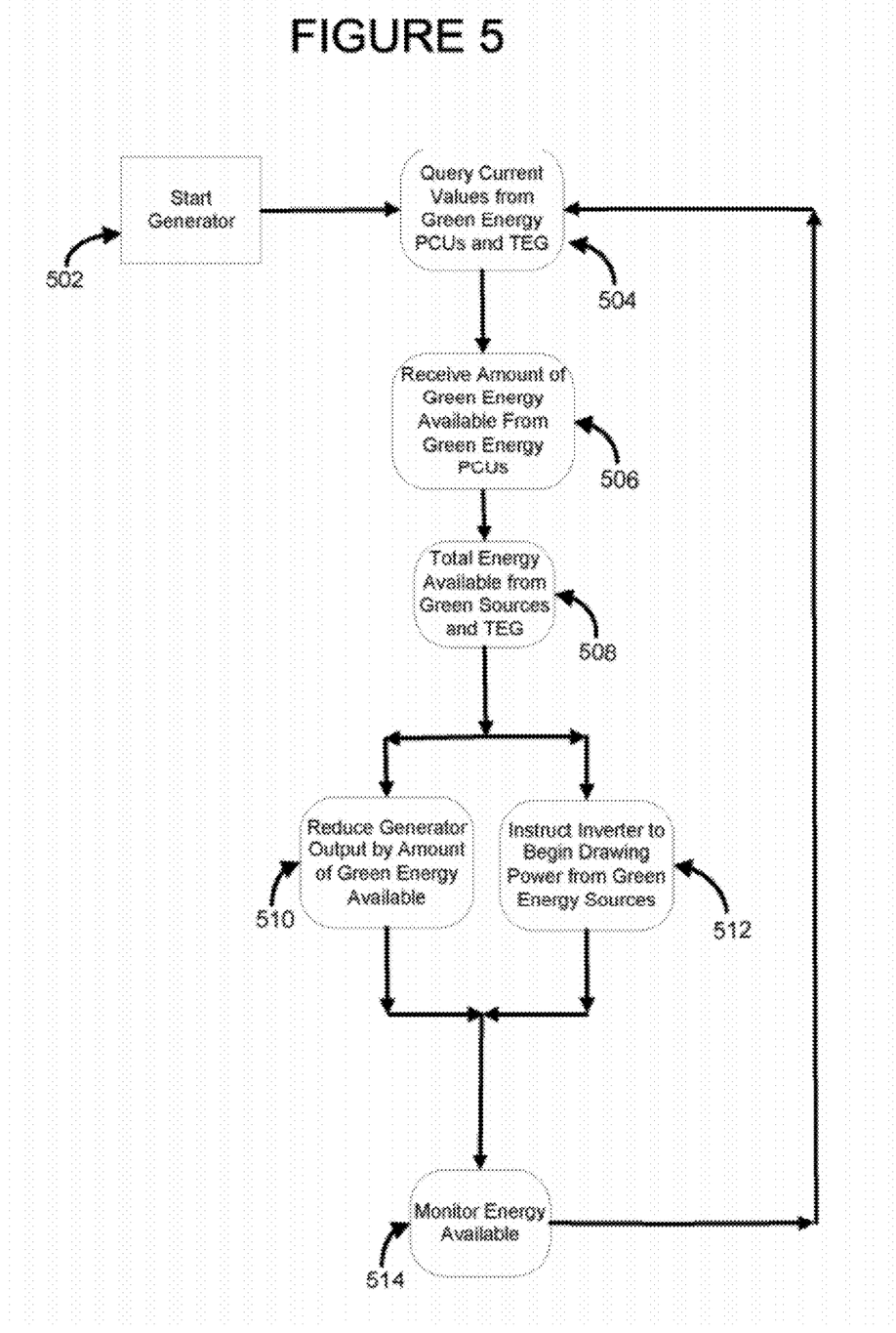
FIG. 5 is a functional block diagram of a process to control a cogeneration system consistent with the present application.

FIG. 5 represents a flow chart demonstrating one method used to determine the generator electrical power output. The operation of the cogeneration system begins when a user starts the generator 102 (Step 502). After the generator begins producing electrical power, the PCUs 200 for each component of the cogeneration system begin operating. The Master PCU 302 queries the PCUs 200 coupled to the renewable energy sources to report the amount of energy each renewable energy source is capable of producing (Step 504). For example, a PCU connected to a solar panel or a wind turbine may send information concerning the amount of electrical power they are capable of producing based on current environmental conditions.

To determine the amount of energy available from a renewable energy source, the PCU 200 controlling the renewable energy converter, for example a solar panel, may receive a signal from a light sensing unit which indicates the current amount of sunlight. The PCU 200 controlling the renewable energy converter could then calculate the amount of electrical power available based on the current amount of sunlight. The PCU 200 controlling the renewable energy converter may then transmit the amount of electrical power they can produce back to the Master PCU 302 (Step 506). The Master PCU 302 could then command the generator to reduce its electrical power output by the amount equal to the electrical power supplied from the solar panel and wind turbine.

Once the total amount of energy available from each renewable energy source is calculated, the Master PCU 302 determines the total amount of energy available from the TEG unit 104 (Step 508). Based on this calculation the Master PCU 302 sends a signal to the generator 102 to reduce or increase the electrical power output based on the amount of electricity needed and the amount of electricity supplied from the TEG 104 and renewable energy sources combined (Step 510). Simultaneously, the Master PCU 302 sends a signal to the PMGI 106 to begin drawing electricity from the available renewable energy sources (Step 512).

The Master PCU 302 then monitors the electrical power available from all sources, including the TEG unit 104, as well as the electrical power actually provided from each of the sources and continuously sends signals to the generator 102 to increase or decrease the generator's 102 electrical power output so the cogeneration system 100 outputs a constant amount of electrical power (Step 514).

In one embodiment, the Master PCU 302 monitors the current electrical power requirements of the systems connected to the cogeneration system and continuously resets the amount of electrical power output from the cogeneration system. To accomplish this, the Master PCU 302 monitors the individual electrical power consumption from each electrical power connection on the distribution unit 107 using a electrical power monitoring device. Accordingly, if the required load of the system increases, the Master PCU 302 may signal the energy sources to produce more electricity.

In another embodiment, the Master PCU 302 monitors the status of each piece of equipment in the cogeneration system 100. The Master PCU 302 uses an algorithm to perform predictive maintenance on each component of the cogeneration system 100. Specifically, the Master PCU 302 may keep histories of monitoring points on each system, such as fan amperage. The Master PCU 302 may compare the current values of the monitoring points with historical values of the same monitoring points. If the current values of the monitoring points vary beyond a threshold value, the Master PCU 302 may alert a user of a potential problem before the problem causes failure of the system. In another embodiment, the Master PCU 302 may send a maintenance request to a central site which schedules maintenance on the equipment. By monitoring the status of each piece of equipment, problems with the cogeneration can be fixed before a failure occurs.

In another embodiment, the Master PCU 302 may diagnose the potential problem and develop a repair routine which is displayed on the display device 218. To accomplish this, the Master PCU 302 will analyze the current status of each piece of equipment in the cogeneration system by monitoring a series of sensing units. When the value of a sensing unit deviates beyond a threshold, the Master PCU 302 will examine other sensing units to determine a cause of the problem. After the Master PCU 302 determines the cause of the problem, the Master PCU 302 may query a database 208 containing repair routines and parts lists. The Master PCU 302 will then develop a repair routine and parts list based on the readings from the sensing units and display the repair routine on the display unit. Once the repair is complete, the Master PCU 302 will monitor the sensing units to determine if the repair was accomplished.

Figure 6:
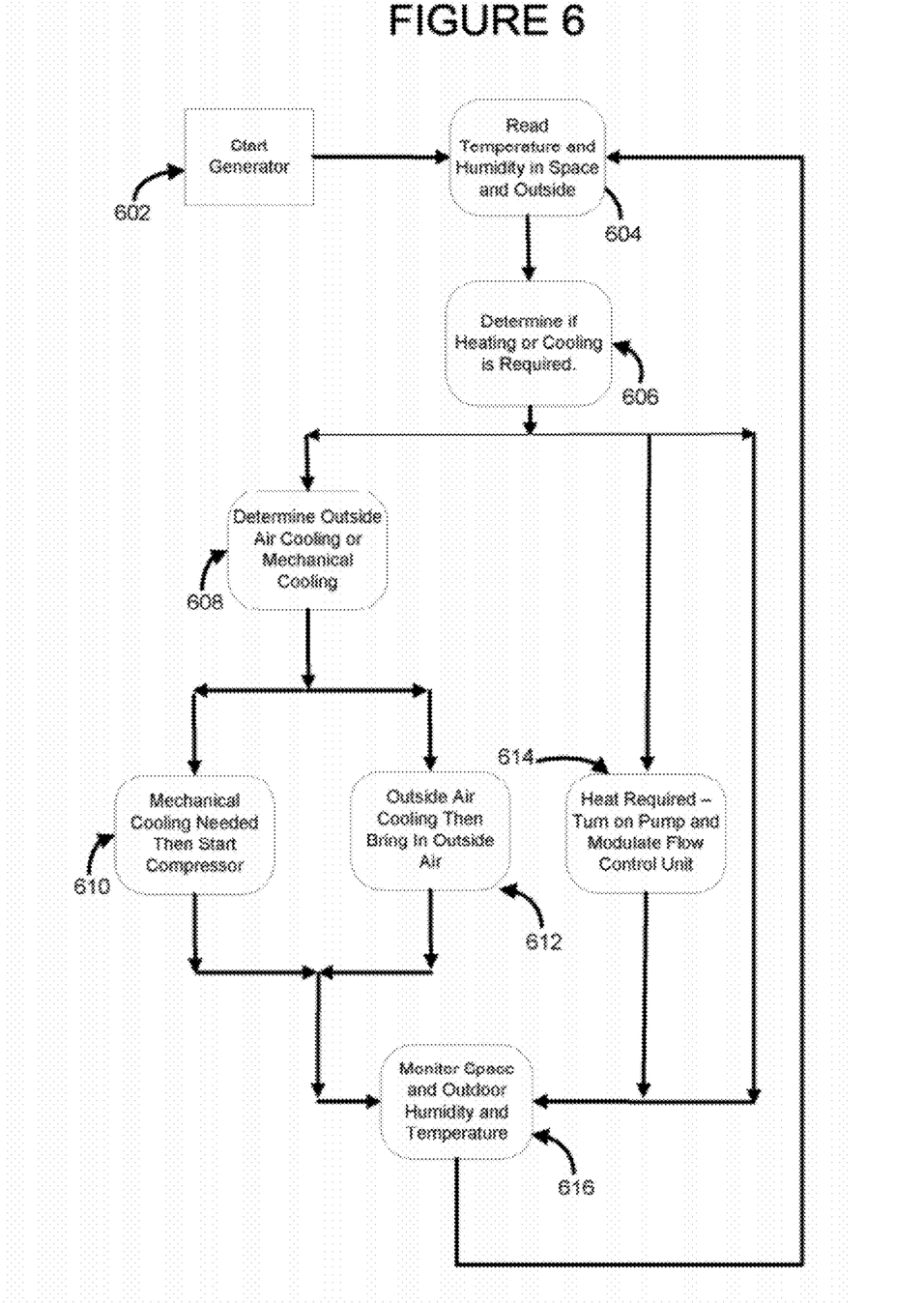
FIG. 6 is a functional block diagram of a process to control an environmental unit consistent with the present application.

FIG. 6 is a functional block diagram of a process to recover heat from the generator 102. The heat recovery system begins after the generator 102 starts and the PCUs begin operating (Step 602). The PCU 200 controlling the AHU 108 queries temperature and humidity sensing units located in the space connected to the AHU 108 and also in an outdoor location (Step 604). Next, the PCU 200 controlling the AHU 108 determines if the space requires heating or cooling based on the values received from the space temperature and humidity sensing units (Step 606). If cooling is required, the PCU 200 controlling the AHU 108 determines if the space can be cooled using outside air based on the values received from the outdoor temperature and humidity sensing units (Step 608).

If mechanical cooling is needed, the PCU 200 controlling the AHU 108 commands the condensing unit 106 to begin operating (Step 610). The condensing unit 106 sends a refrigerant to the DX coil 110 which is then returned to a compressor in the condensing unit 116. The compressor in the condensing unit 116 compresses the refrigerant by engaging and disengaging a rotating shaft or flexible belt, driven by the generator 102 engine, which is coupled to the compressor unit in the condensing unit 116. If the cooling capacity is manageable with outdoor air, the PCU 200 controlling the AHU 108 opens damper units, not shown, in the AHU 108 to supply outdoor air to the space (Step 612). By using outdoor air, the amount of fuel consumed by the generator is reduced further.

If heating is required, the PCU 200 controlling the AHU 108 enables a pumping unit connected to the heating coil 112 and begins modulating a flow control unit 126 hydronically connected to the heating coil 112 (Step 614). The heat supplied to the heating coil 112 is provided from the excess heat created by the generator 102 and is transferred to the heating coil by the heat exchanger 118. The PCU 200 controlling the AHU 108 continuously adjusts the mode of operation and the amount of cooling and heating based on the space and outdoor temperature and humidity (Step 616).

By incorporating renewable energy sources into the cogeneration system, reducing the generator operating speed, and recovering the heat produced by the generator, the amount of fuel consumed is reduced. Further, the cogeneration system is able to operate for a longer duration without the need to refuel.

Table 1 below shows a comparison of the gallons per hour of fuel consumed by a 30 kW generator and the disclosed cogeneration system without any renewable energy input.

TABLE 1

| Conditions | 30 kW Generator | Cogeneration System | Fuel Efficiency Change |
|---|---|---|---|
| 15 kW Electrical Demand | 1.25 | 1.13 | −10% |
| 15 kW Electrical Demand with Cooling | 2.15 | 1.75 | −19% |
| 15 kW Electrical Demand with Heat | 2.08 | 1.26 | −39% |

As Table 1 demonstrates, by using the disclosed cogeneration system, substantial fuel savings are realized. The addition of renewable energy sources can further reduce the fuel usage of the generator.

While various embodiments of the present disclosure have been described, it will be apparent to those of skill in the art that many more embodiments and implementations are possible that are within the scope of this disclosure. Accordingly, the present disclosure is not to be restricted except in light of the attached claims and their equivalents.

What is claimed is:

1. A system for power generation having a plurality of energy sources, comprising:
   a power generation unit;
   a thermal energy generation unit coupled to the power generation unit, wherein the thermal energy generation unit converts heat energy from the power generation unit into electrical energy;
   at least one renewable energy conversion unit including a light sensing unit and a renewable energy conversion unit programmable control unit configured to calculate an amount of power available from the renewable energy conversion unit based at least in part on a signal from the light sensing unit;
   a power distribution unit configured to receive and distribute power from the power generation unit, the thermal energy generation unit and the renewable energy conversion unit; and
   a master programmable control unit configured to:
      determine a combined amount of calculated available power, wherein determining the combined amount of calculated available power includes:
         receiving a signal from the renewable energy conversion unit programmable control unit, the signal including a calculated amount of power available from the renewable energy conversion unit; and
         calculating an amount of power available from the thermal energy generation unit;
      modify an amount of power produced by the power generation unit based on the combined amount of calculated available power, wherein the modification to the amount of power produced by the power generation unit is such that the power generation unit continues to produce power at a first modified level; and
   the master programmable control unit is configured to subsequently:
      determine a combined amount of provided power, wherein determining the combined amount of provided power includes:
         determining an amount of power provided from the at least one renewable energy conversion unit; and
         determining an amount of power provided from the thermal energy generation unit; and
      modify, by the power distribution unit, the amount of power produced by the power generation unit based on the combined amount of provided power, wherein the modification to the amount of power produced by the power generation unit is such that the power generation unit continues to produce power at a second modified level.

2. The system of claim 1 further comprising an environmental unit which includes (1) a cooling unit including a compressor which is mechanically coupled to the power generation unit, (2) a heating unit thermally coupled to the power generation unit and (3) a fan unit electrically coupled to the power generation unit.

3. The system of claim 2, wherein heat produced by the power generation unit is transferred to the heating unit by the thermal coupling.

4. The system of claim 2, wherein the power generation unit mechanically drives the compressor.

5. The system of claim 1, wherein heat from the power generation unit is transferred to the thermal energy generation unit.

6. The system of claim 5, wherein excess heat from the power generation unit is transferred from the thermal energy generation unit to a heating unit thermally coupled to the power generation unit.

7. The system of claim 1, wherein the renewable energy conversion unit is a solar panel.

8. The system of claim 1, further comprising a plurality of renewable energy conversion units.

9. The system of claim 8, wherein at least one of the plurality of renewable energy conversion units is a solar panel.

10. The system of claim 8, wherein at least one of the plurality of renewable energy conversion units is a wind turbine.

11. The system of claim 1, wherein the entire system is mounted on a portable skid.

12. The system of claim 11, wherein the dimensions of the system together with the portable skid is approximately 82"L×36"W×59"H.

13. The system of claim 1, wherein the thermal energy generation unit is thermally coupled to the power generation unit.

14. The system of claim 1, wherein the thermal coupling is a heat transfer device.

15. The system of claim 1 further comprising an environmental unit which includes (1) a cooling unit including a compressor which is electrically driven, (2) a heating unit thermally coupled to the power generation unit and (3) a fan unit electrically coupled to the power generation unit.

16. A method of controlling a system for power generation having a plurality of energy sources, comprising:
    determining a combined amount of calculated available power, wherein determining the combined amount of calculated available power includes:
        receiving a signal from a renewable energy conversion unit programmable control unit, the signal including a calculated amount of power available from a renewable energy conversion unit; and
        calculating an amount of power available from a thermal energy generation unit, wherein a power generation unit provides thermal energy to the thermal energy generation unit;
    transmitting a first signal to the power generation unit instructing the power generation unit to modify an amount of power produced by the power generation unit, wherein the modification to the amount of power produced by the power generation unit is such that the power generation unit continues to produce power at a first modified level, wherein the amount of the modification to the amount of power produced by the power generation unit is based on the combined amount of calculated available power;
    subsequently determining a combined amount of provided power, wherein determining the combined amount of provided power includes:
        determining an amount of power provided from the thermal energy generation unit; and
        determining an amount of power provided from the renewable energy conversion unit; and
    transmitting a second signal to the power generation unit instructing the power generation unit to modify the amount of power produced by the power generation unit, wherein the modification to the amount of power produced by the power generation unit is such that the power generation unit continues to produce power at a second modified level, wherein the amount of the modification to the amount of power produced by the power generation unit is based on the combined amount of provided power.

17. The method of claim 16, wherein the amount of power available from the renewable energy conversion unit is based on at least one environmental condition and the amount of power available from the thermal energy generation unit is based on at least one operating parameter of the power generation unit.

18. The method of claim 16, wherein at least one of the first signal and the second signal to the power generation unit instructs the power generation unit to reduce the amount of power generated by the power generation unit when the amount of power needed by the system is less than the total amount of power available from the renewable conversion unit, the thermal energy generation unit, and the power being generated by the power generation unit.

19. The method of claim 16, wherein at least one of the first signal and the second signal to the power generation unit instructs the power generation unit to increase the amount of power generated by the power generation unit when the amount of power needed by the system is more than the total amount of power available from the renewable conversion unit and the thermal energy generation unit and the power being generated by the power generation unit.

20. The method of claim 16, further comprising:
    determining the electrical load connecting to the system, and
        adjusting the power output of the system to meet the connected electrical load.

21. The method of claim 16, further comprising:
    continuously adjusting the power produced by the power generator based on the actual power provided by the renewable energy conversion unit and the thermal energy generation unit, and
        adjusting the power output of the cogeneration system to meet a connected electrical load.

22. The method of claim 16, further comprising monitoring the renewable energy conversion unit and the thermal energy generation unit.

23. The method of claim 22, wherein monitoring comprises:
    comparing at least one historical monitoring point value with a current monitoring point value;
    wherein when a current monitoring point value varies from a historic monitoring point value in excess of a threshold value, a maintenance request is transmitted.

24. The method of claim 22, wherein monitoring comprises:
    comparing at least one historical monitoring point value with a current monitoring point value;
    wherein when a current monitoring point value varies from a historic monitoring point value in excess of a threshold value, a repair routine is determined.

* * * * *